Jan. 13, 1970 P. L. CARPENTER 3,489,267
COOKING KIT FOR CAMPERS AND THE LIKE
Filed Nov. 17, 1967 4 Sheets-Sheet 1
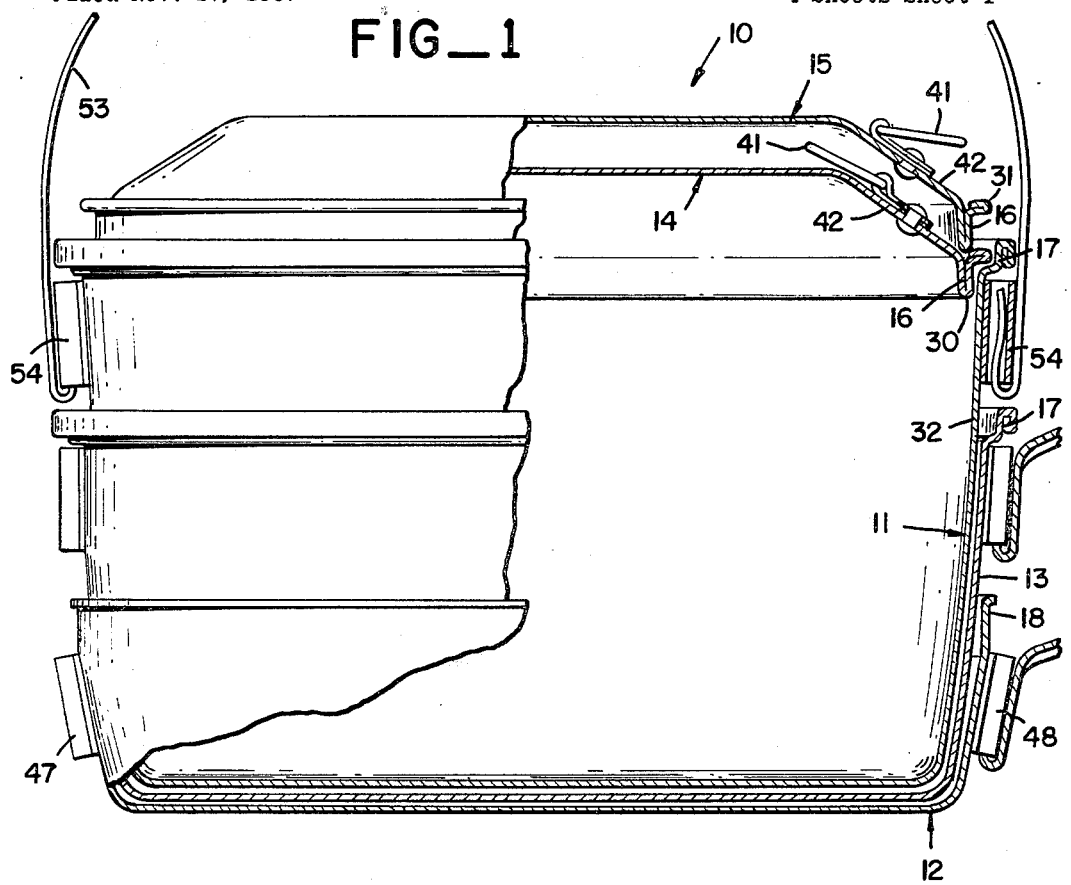
FIG_1
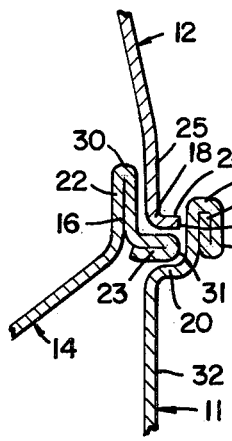
FIG_2
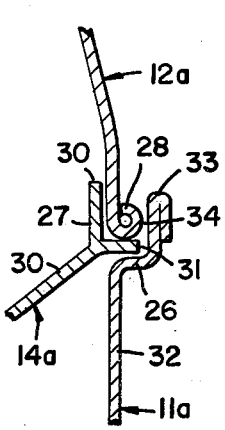
FIG_3
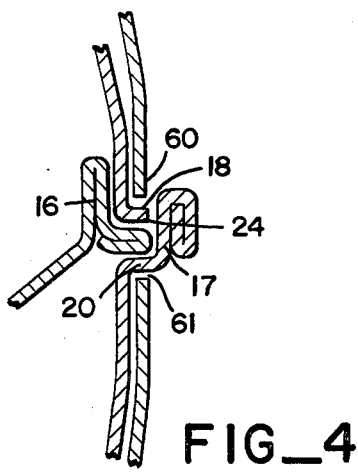
FIG_4
INVENTOR.
PHILIP L. CARPENTER
BY
Owen, Wickersham & Erickson
ATTORNEYS Jan. 13, 1970    P. L. CARPENTER    3,489,267
COOKING KIT FOR CAMPERS AND THE LIKE
Filed Nov. 17, 1967    4 Sheets-Sheet 2
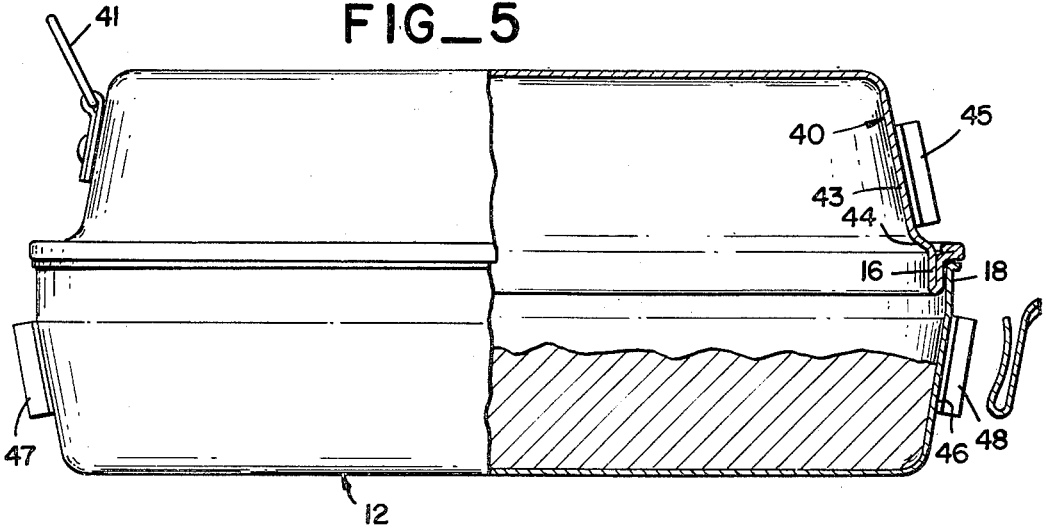
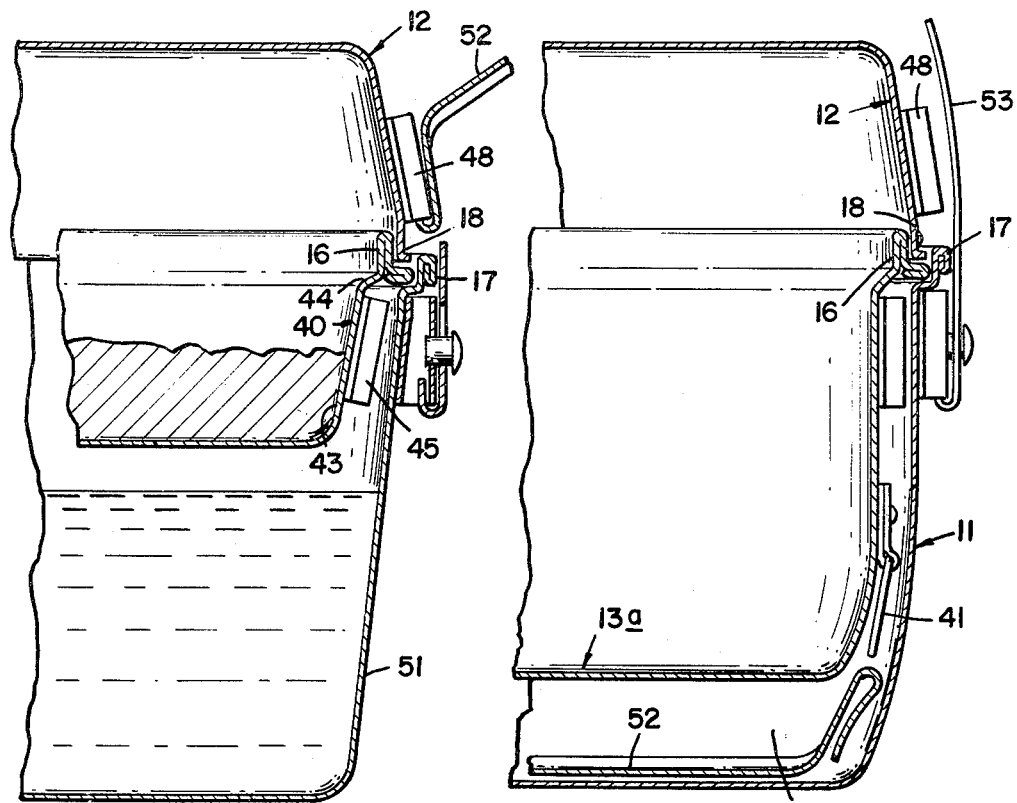
INVENTOR.
PHILIP L. CARPENTER
BY
Owen, Wickersham & Erickson
ATTORNEYS Jan. 13, 1970    P. L. CARPENTER    3,489,267
COOKING KIT FOR CAMPERS AND THE LIKE
Filed Nov. 17, 1967    4 Sheets-Sheet 3
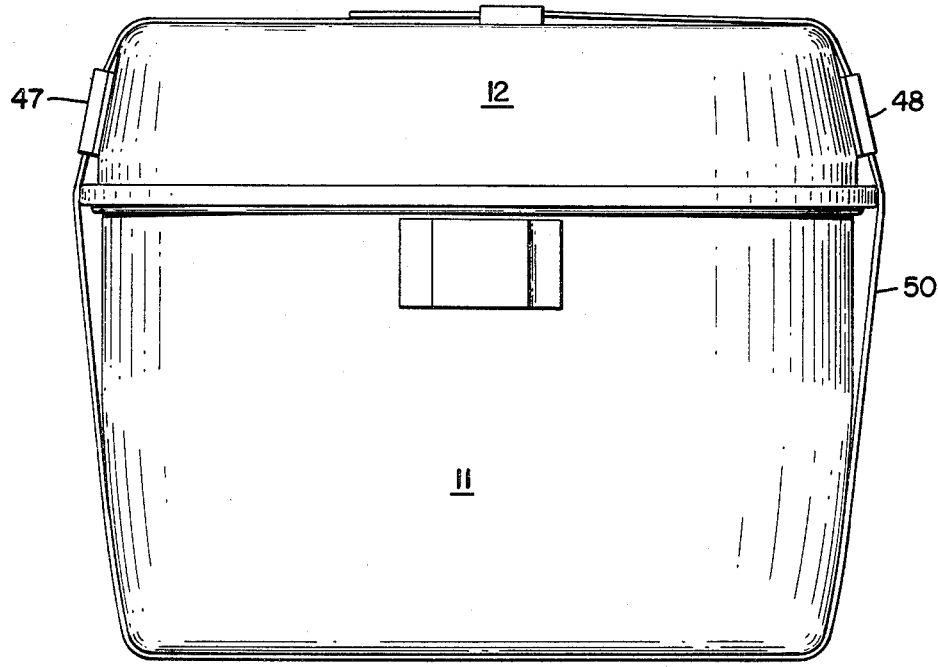
FIG_8
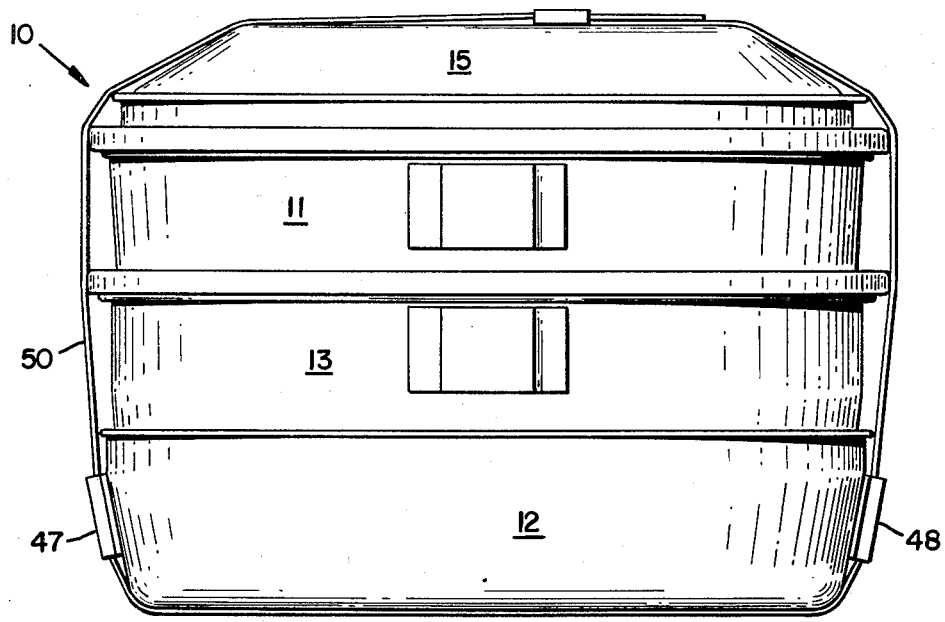
FIG_9
INVENTOR.
PHILIP L. CARPENTER
BY
Owen, Wickersham & Erickson
ATTORNEYS

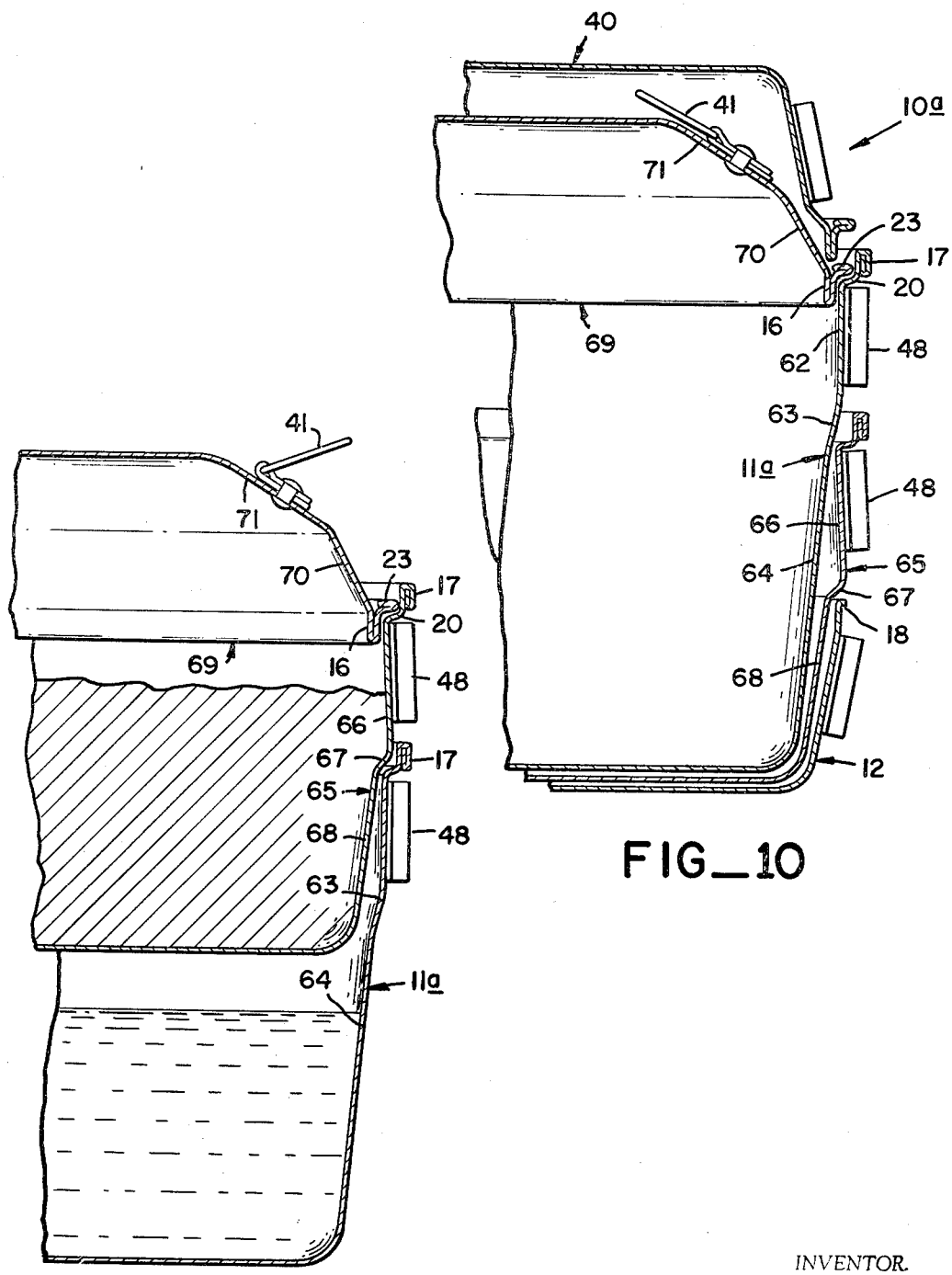

United States Patent Office 3,489,267
Patented Jan. 13, 1970

3,489,267
COOKING KIT FOR CAMPERS AND THE LIKE
Philip Lattimore Carpenter, Grand Valley, Colo.
(Rte. 1, Box 282, Buena Vista, Colo. 81211)
Filed Nov. 17, 1967, Ser. No. 683,844
Int. Cl. H01j *19/70;* B65d *7/04, 21/00*
U.S. Cl. 206—4                  12 Claims

ABSTRACT OF THE DISCLOSURE

This cooking kit for campers and the like enables use of various utensils in combinations with other utensils and compact packing of the whole. There is (1) at least one utensil having an outwardly-stepped rim with a horizontal shoulder encircled by a vertical bead, (2) at least one utensil having a double-edged rim provided with an outer edge having a generally vertical flange and, outside the vertical flange and below it, a horizontal flange that is adapted to rest on the horizontal shoulder of the first-named utensil (1), and (3) at least one utensil having a rim adapted to rest alternately and at different times on the horizontal flange of the utensil (2) and the horizontal shoulder of the utensil (1). This last-named utensil (3) can serve as a cover for a utensil (1) and so can a utensil (2), and the second utensil (2) can also serve as a cover for the utensil (3). The three can be put together with the utensil (2) sandwiched between the other two utensils. The assembly is then strapped to give a unit.

---

This invention relates to a cooking kit for campers and the like.

One reason why the cooking of campers is often considered monotonous is the relatively small number of cooking utensils that campers can carry, and the resulting lack of variety in the types of cooking treatment that can be given to the food. If the camper has only a kettle and a frying pan with possibly a cover for the kettle and none for the frying pan, he is certainly limited in what he can do. Consequently, one of the objects of this invention is to provide a cooking kit capable of a variety of types of cooking and including a variety of cooking implements.

A principal reason for the lack of variety and versatility in campers' cooking sets heretofore has been the necessity of providing a compact cooking kit which takes up but a small amount of space and which is preferably relatively light in weight. Even when weight is not at a premium, space usually is, and campers simply cannot carry the variety of cooking implements found at home. The present invention recognizes this and provides a camper's cooking kit which is quite compact and in which all the implements can be stored in a space not much larger than that of the largest implement used. Every implement in the kit fits together with the other implements in a most compact whole.

An important feature of the present invention is that the various implements all cooperate with each other, and yet not all the various implements need to be taken along; so on a knapsack trip, a camper can select and carry only certain implements, not having to carry the whole kit; yet those implements, too, fit together, and form a compact unit. Each component is compatible with every other component, both as to use and packing.

The invention is based on the use of three different types of rims, which may be exemplified by the respective rims of a kettle, a frying pan, and a combination plate and cover member. The kettle has an out-stepped rim providing a shoulder which enables it to accept either the frying pan or the plate as a cover, and it will also accept the plate in a double boiler adaptation. The frying pan has a plain rim which enables it to be used as a cover for the kettle, and it can also be used as a plate or can be used in frying with the plate as a cover. The plate-cover member has a bifurcated rim that enables it to be used as a cover for either the kettle or the frying pan, and also to be used inverted with the kettle in a double boiler adaptation, to warm food in the plate without scorching it.

Other units—such as additional plates and saucepans—may be provided with one of these three types of rims and included in the kit. If more than one plate is used, sufficient space is provided between plates when they are stacked so that each plate may carry a D-ring and yet this space adds little to the volume of the kit. The D-rings are placed so that they do not interfere with the plates lying generally flat and stacking snugly, and do not interfere with the adaptation of one plate in a double boiler. Other utensils may be used in the kit, as will be explained, and the kit can be used in a variety of ways.

Other objects and advantages of the invention will appear from the following description of some preferred embodiments.

In the drawings:

FIG. 1 is a view in elevation, partly broken away and shown in section, of a kit embodying the principles of the invention. The top portion of the bail is broken away, and handles are shown inserted into two of the utensils.

FIG. 2 is an enlarged view in elevation and in section of the rim portion of three utensils, each having a different type of rim as is provided in the present invention, showing how they fit with each other.

FIG. 3 is a view similar to FIG. 2 showing a somewhat different formation of each of the three rims.

FIG. 4 is a similar view of still another adaptation of rims, also showing how two additional utensils may be fitted in.

FIG. 5 is a view half in elevation and half in section of the frying pan and plate-cover of the invention put together for use as a covered fry pan. A portion of a detachable handle for the frying pan is illustrated at one side.

FIG. 6 is a fragmentary view in section of one side of the kit of the invention, in which the kettle, frying pan and plate are used as a covered double boiler.

FIG. 7 is a fragmentary view similar to FIG. 6 of another modified form of the kit shown assembled for packing.

FIG. 8 is a view in side elevation of the kit of FIG. 7 showing how a strap holds it together.

FIG. 9 is a view in side elevation of the kit of FIG. 1 as strapped together.

FIG. 10 is a fragmentary view in section of one side of another embodiment of my kit.

FIG. 11 is a fragmentary view in section of one side of the kit of FIG. 10, arranged for use as a double boiler.

The camping kit 10 shown in FIG. 1 comprises a kettle 11, a frying pan 12, a saucepan 13, and two identical plate covers 14 and 15. In the assembly shown here, the kettle 11 is nested in the saucepan 13, and the saucepan 13 is nested in the frying pan 12, and the two plates 14 and 15 used as a cover for the kit 10, fitting over the kettle 11, the upper plate 15 being stacked over the lower plate 14 and both plates being inverted. As will be seen, the plates 14 and 15 will stack either way, and the frying pan 12 could be used as the cover for the kit 10.

At least three types of rims are employed—an important feature in enabling the compact stacking and versatility of the kit, and enabling the different cooking implements to be used interchangeably and in various combinations with each other. As shown in FIGS. 2, 3 and 4, various types of rims may be used, but basically the invention requires three main types, namely, (see FIG. 2) a double-edged rim 16 (which is preferably used on the plates 14 and 15), an out-stepped rim 17 with a shoulder (such as is used on the kettle 11 and saucepan 13), and a simple rim 18 (which may be used on the frying pan 12).

Thus, as shown in FIG. 2, the rim 17 of the kettle 11 may be made by providing an outward step having a horizontal portion or shoulder 20 and a vertical portion or bead 21. The bead 21 may be finished by double-folding the metal in ways that are commonly used with sheet metal to provide a heavier bead. The step provides what may be called a "recessed rim," although it is really stepped outwardly. This step may be used to receive any of the other type of rims.

The plates 14 and 15 are provided with what I term a double-edged rim 16, which in this instance comprises a vertical flange 22 which may be made double-thickness, as shown, succeeded by a lower, horizontal flange 23 which also may be doubled to give a good, thick rim 16. The sizing of the rims 16 and 17 relative to each other is important: any rim 16 fits on any rim 17 and rests on the shoulder 20 in either position of the plate, that is, whether it is in the position shown in FIG. 1 or a position like that of the plate-cover shown in FIG. 6.

The frying pan 12 is provided with what may be termed a simple edge, which may include a short out-turned flat flange 24 rim at the end of a short generally vertical portion 25, as shown in FIG. 2.

As shown in FIG. 3, there are various possible forms of the rims that are somewhat different. An outer rim 26 for the kettle 11a, for example, can be made more simply by a simple doubling of the bead instead of tripling it. A plate 14a may be formed to provide a rim 27 with a simple, single thickness for each flange, and a rim 28 for the frying pan 12 may have a rolled edge.

The frying pan 11 may be made of heavier metal than the other parts if that is desired, or may be made thin if that is preferred. The thickness of such an element is no important factor in this invention.

The double-edged rim 16 may be broadly defined as an upwardly extending cylindrical or conical portion 22 terminating in an edge 30, and an external, substantially horizontal, radially extending flange portion 23 terminating outwardly in an edge 31, the juncture between the portions 22 and 23 forming an angle of about 90° or somewhat greater. The rim 17 may be defined as a substantially horizontal flange 20 having its juncture with the main body 32 of the vessel and extending radially to its juncture with a substantially vertical, cylindrical portion 21, which terminates upwardly in an edge 33. The simple rim 18 may be with or without a substantially horizontal, radially extending flange 24 terminating outwardly in an edge 34.

With this type of structure, three vessels 11, 12 and 14 may be manufactured to fit neatly with the rims 16, 17 and 18 of all three together, the rim 16 of the double-edged rimmed vessel 14 being sandwiched between the rims 17 and 18 of the other two vessels 11 and 12. The double-edged rimmed vessel 14 may be in either its inverted or upright position.

The bead 21 of the rim 17 is preferably high enough to retain both a rim 16 of a double-edged rimmed vessel 14 and a rim 18 of a simple-rimmed vessel 12 when all three vessels are put together, thereby making a neat fit whether the double-edged rimmed vessel 14 is in the inverted or upright position. The horizontal flange 23 of the rim 16 and the shoulder 20 of the rim 17 are both preferably sufficiently wide to enable secure seating of the two rims when the two are fitted together. This means that there is a relatively large space between the outside of the upwardly extending flange 22 and the inside of the bead 21, into which the rim 18 of the simple-rimmed vessel 12 fits. If the wall thickness of the simple-rimmed vessel 12 were too thin to occupy enough of this space there would be a too-sloppy fit, and that is why (and when) there should be the additional thickness imparted by the flange 24, or a bead or other means. Since a substantially horizontal, radially extending flange terminating in an edge is traditional for frying pans, it is recommended here.

The vertical flange 22 is preferably high enough to provide a secure fit with the rim 18 when all three vessels are together, including one or more double-edged rimmed vessels 14 with their flange 22 up.

The smallest inside diameter at the rim 18 of the plain-rimmed vessel 12 is preferably about the same as that of the vessel 11, so that there is substantially the same degree of snugness of fit of the double-edged rimmed vessel 14 with each of these other two vessels.

Nothing is intended to imply that the fits must really be tight. The manufacturer of the kit may decide on various degrees of closeness, and the broad concept of the invention makes possible varying degrees of tightness. Also, the drawings indicate the use of sheet metal, for the kit 10 may be made of sheet aluminum, but this is not necessary. The vessels may be turned from castings, or one of the vessels may be made as a casting, if desired. If the vessels are made from sheet metal, they need not all be made of the same gauge material; for example, the frying pan 12 may be made of thicker gauge material than the others. Preferably, the handles and bails are made of a metal other than aluminum which does not conduct heat too rapidly, but that is not a significant part of the invention.

When the three vessels 11, 12, and 14 have been assembled with their rims 16, 17 and 18 together, the double-edged rimmed vessel 14 lies within the space enclosed by the frying pan 12 and the kettle 11, therefore, it has to be smaller than one of those vessels. Aside from this restriction, the double-edged rimmed vessel 14 may be of any shape or size consistent with its intended function in the kit, and its depth may range from a very shallow, plate-like formation to a depth such that it touches the bottom of whichever vessel it is to nest within. If it is to nest within both vessels, then it preferably should be no deeper than the shallower of those two. Its width may have similar variations and yet remain compatible for the kit.

A plate 14 or 15 of this invention may be used as the upper kettle of a double boiler with the kettle 11 holding the water, the plate 14 or 15 resting in it and holding the other food such as milk, cream of tomato soup, or anything else which is desired to be heated with a double boiler. In this instance, the frying pan 12 may be used as a cover for the double boiler in the manner shown in FIG. 6. Any liquid which condenses on either the inner surface of the frying pan 12 or on the outer surface of the plate 14 will drip into the kettle 11, rather than dripping down the outside.

Similarly, the plate 14 in the inverted position may be used as a cover for the frying pan 11, in the manner shown in FIG. 5. Again, condensed liquid drips down into the frying pan rather than flowing outside.

The kettle 11 can be covered either by a plate 14 or 15, as shown in FIG. 1, or by the frying pan 12, as is fairly inferrible from FIGS. 6 and 7, so that either a plate or pan may be used as the cover for the kettle 11. This gives some indication of the variety of this invention.

As shown in FIG. 1, the saucepan 13 has a rim 17 identical in size and shape to that of the kettle 11, and therefore, either the frying pan 12 or a plate 14 and 15 may be used as a cover on the saucepan 13. In fact, the saucepan 13 may also be used as a cover for the frying pan 12, if that is desired.

The plate may be made shallow like the plates 14 and 15 in FIG. 1, or may be made deeper like a plate 40 shown in FIGS. 5 and 6. The plates 14 and 40 are usually interchangeable with each other, both in stacking relation with other plates and in consideration of their use as covers for the various other implements. Whether made shallow or deep, a stack containing any number of either kind may be formed, and deep ones may be stacked over shallow ones. Either type stacks into any other vessel of the kit 10. If the plate 40 is made so deep that it does not stack into the frying pan 12, but would still stack into the kettle 11, then it could be used as an inner warming vessel in the position shown in the plate 40 in FIG. 6 and could be carried in that position. The dimensions for the vessels are readily adaptable so that when stacked with any other vessel the only contact between them is at the rims, and this is the preferable way of designing a kit of this invention. Therefore, there will be clearance between the plate and the frying pan, for example.

The plates 14, 15 and 40 are preferably equipped with D-rings 41 for convenience when using them as covers for other vessels, although this is not essential. They may be used in the inverted position as covers for all vessels except other double-edged rimmed vessels.

The sidewalls of the plates preferably include a suitably sloped portion 42 or 43 such that when D-rings 41 are employed they can be installed on this sidewall portion without interfering with the use of the vessel 14, 15 or 40 as a plate when it rests on a flat surface. The slope in the plate 14 or 15 is preferably sufficiently shallow to provide adequate clearance for the D-ring assembly 41 when the vessel is stacked with any other vessel of the kit. The deeper type of plate cover 40, such as that in FIGS. 5 and 6, has a steep sloping sidewall 43 portion to provide depth. The deeper type of plate 40 may have at the lower portion of the rim 16 a narrow, inwardly and downwardly extending sidewall portion 44 providing an exterior shape enabling secure stacking of the vessels with the D-ring in between.

Preferably the frying pan 12 and the deep type of plate cover 40 are of substantially the same depth, and in that case the shape of the frying pan 12 is such as to provide clearance for the D-rings 41, the depths being readily chosen to enable this to be done. By providing a plate 40 with a handle fitting 45, the plate 40 can be used as an additional fry pan, in addition to its functions as the cover or plate. It will still stack into any of the vessels of the kit except other double-edged rimmed ones, the handle fitting 45 preventing it from stacking into these. Only one vessel with such a fitting 45 is used in any one kit, because that is all that will fit within it.

The vessels 11 and 13 with the rim 17 are shaped so that a lower one fits over the bottom of a higher one. These vessels are preferably all of the same constitution except for their height.

The frying pan 12 is usually the only simple-rimmed vessel in the kit 10, having its rim 18 wide enough to insure a neat fit rather than a sloppy one when the frying pan 12 is assembled into the kit 10 or used with the other vessels. It accepts all the other vessels of the kit as covers, but the double-edged rimmed vessels are the best for covers, since the kettle 11 is usually a little deep for this, though it can be used. The frying pan 12 is preferably fairly deep, so that when cooking on campfires one is less likely to spill the contents of the pan. Its sidewalls 46 preferably are steeply sloped to provide the maximum bottom area for a given diameter of the frying pan. If desired, the pan 12 may be made relatively deeper or shallower and the slope of its sides may be shallower or deeper than what are shown in the drawings, and the bottoms of the vessels which are to nest in it may be shaped accordingly. Preferably, the frying pan has two handle fittings 47 and 48 so that the frying pan 12 may be used to put a strap 50 through to secure the kit 10 for packing, as shown in FIGS. 8 and 9. It is assumed that a frying pan 12 will be present in every kit assembly, since this is normal in camp cookery. Only one vessel need have the strap-securing fittings 47 and 48 in order to hold the whole kit 10 together.

A basic kit is a kit with three vessels, such as a kettle 11, a plate 14 and a frying pan 12; in any event, the basic kit has three vessels, each having a different one of the rim types 16, 17 or 18. The basic kit may be added to, to provide additional vessels, as shown in FIG. 1, so that there may be two or more double-edged plates 14 and 15, stacked as shown in FIG. 1, and there may be saucepans 13 or other kettles, as shown in FIG. 1. In fact, if desired, there may be more than one frying pan 12, though one is usually sufficient. The simplest form of kit, the three-piece one, would probably be chosen by knapsackers and climbers; in many instances they might prefer a type of kit having two boiling vessels and no frying pan, because they currently use much dehydrated food, and boiling water is needed more than is a frying pan. In that case, there would be one kettle with a rim 17 and one with a rim 18. They may omit the plates entirely for the sake of lightness, and that is perfectly feasible with this invention.

As an illusration of the variety of this invention, hot cereal may be prepared by placing the cereal in the deep plate 40 on the double boiler of FIG. 6, with boiling water in the kettle 51, and the frying pan 12 used as a cover. This would require less attention than other ways, since there is small danger of burning the food so long as there is water in the outer vessel 51, and there is little danger of its boiling over. If one wishes to do both boiling and frying at the same time, however, the boiler 51 and frying pan 12 can be used separately with the plate 40 covering either one, or if there are two plates available, covering both of the vessels. Also, the deep type plate 40 as well as the saucepan 13 may be used for additional boiling, and a removable handle 52 of the frying pan 12 can be used to help in this instance.

If a bail 53 is desired, a permanent bail may be installed, or a detachable bail may be inserted as shown in FIG. 1 into fittings 54 provided on the outside of the kettle 11. Also, detachable handles 52 may be inserted into such a fitting 54 and the detachable bail 53 and the detachable handle 52 may therefore be used interchangeably. Such a fitting 54 may also be provided on the saucepan 13 as shown, or it may be omitted if preferred. The same type of fitting is preferably used on the saucepan 13 in two locations also.

If no detachable bail 5 is to be used, there need be only one handle fitting for implements not having the bail, such as the saucepan 13.

In the form of the invention shown in FIG. 1, the curves 56 at the junctures of the sidewalls on the bottom may have extra clearance between them. It is generally preferred that the sidewalls of the kettle 11 be straight instead of curved, for both the esthetic and functional operation, but those of the saucepan 13 may be somewhat curved as shown in FIG. 7. The kit may be packed in the condition shown in FIG. 1 by putting a strap 50 through the two fittings 47 and 48 on the frying pan 12, and have the strap 50 pass completely around the stacked kit, thus giving the result shown in FIG. 9. It could also be packed by inverting the frying pan 12 over the kettle 11, in substantially the condition shown in FIG. 7, and then passing the strap 50 around, so that it would go beneath the saucepan 13, thus giving the result shown in FIG. 8. The kit will stack in either of these two ways.

In the invention as illustrated, it is possible to carry quite a few items of food inside the kit. Note the space available in FIG. 1. Note also that either the saucepan 13 or the kettle 11 could be left at home if desired, or left at the base camp for a knapsack overnight trip.

In FIG. 7, an alternative packing arrangement is shown in which a saucepan 13 with a double-edged rim 16 is used and in which, by way of example, no plates 14 or 40 were used. However, plates could be used, being stacked just as before onto this rim 16 of the saucepan 13, and the frying pan 12 could still cover over them. In this particular packing, there is a D-ring 41, on the saucepan 13, with space provided between it and the kettle 11, and in the space 58 between the bottom of the kettle 11 and the bottom of the saucepan 13 the detachable handle 52 or the bail 53, even, may be placed in that space. The kit of FIG. 7 might be termed a mountaineer's cooking kit.

In FIG. 4, is shown an assembly in which there might be five utensils in a kit, with all five rims fitted together. Some of the fits might be slightly sloppy, but this is still quite feasible. It will be seen that there are two utensils with straight edges 60 and 61 which might fit in either of the two positions shown, so that one bears on the bottom of the shoulder 20, and the other bears on the flange 24 on the frying pan 12.

In a somewhat modified form of my kit designated by the numeral 10a in FIG. 10, a relatively high wall kettle utensil 11a is provided with an out-stepped rim 17 with a shoulder such as used on the kettle 11. Extending downwardly from its upper rim is a substantially vertical wall portion 62 which is wide enough to accommodate a bail or handle fitting 48. At the lower end of the vertical wall portion is an inwardly sloped portion 63 which joins to a lower wall portion 64 that preferably slopes at a slightly lesser degree than the portion 63. Combined with this kettle utensil 11a is a shallower saucepan type of utensil 65 which also has an out-stepped rim 17 with a shoulder as provided on the kettle 11a. It also has a substantially vertical wall portion 66 that extends below the rim 17 and accommodates a fitting 48. Around the lower end of the vertical wall portion a relatively abrupt inwardly extending shoulder 67 is formed, and this is joined to an inwardly sloping lower wall portion 68. As shown in FIG. 11, the shoulder 67 provides a means to support the saucepan on the shoulder of the out-stepped rim 17 of the kettle 11a so that a double boiler arrangement can be made with the kit 10a.

FIG. 10 illustrates how the kit 10a can be utilized in combination with other utensils when assembled in a compact unit for packing. The lower end of the kettle 11a is small enough to fit within the shallower saucepan 65 which in turn may be nested in a frying pan 12 having a simple rim 18. Yet the relatively shallow saucepan 65 can reverse its position and be inserted within the kettle in a double boiler arrangement, as shown in FIG. 11.

A deep plate-cover 69 having a double-edged rim 16 of the form previously described preferably serves as an inner cover for this kit arrangement, its flange portion 23 resting on the horizontal shoulder 20 of the kettle rim 17. This deep plate has first and second inwardly sloping portions 70 and 71. The first portion adjacent its rim slopes at a greater angle than the second annular portion which joins with a planar bottom. These two slope angles, as shown, allow for clearance between a D-ring 41 and a plate 40 of the type previously described, or another plate 69, or a frying pan 12, which may be placed over the deep plate 69 and serve as a cover for the kit. Here, the double-edged rim of the plate 40 rides on top of the similar type edge rim of the deep plate, and the entire kit may then be strapped together in the same manner as shown in FIGS. 8 and 9. A plurality of deep plates 69 could, of course, be included in this kit arrangement by stacking them on top of the first deep plate. When not needed, the deep dish plate could be eliminated. The increased flexibility which offers a large number of utensil kit combinations should be readily apparent from the foregoing.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A cooking kit for campers and the like enabling use of various utensils in combinations with other utensils and compact packing of the whole, including in combination:
    at least one first utensil having an outwardly-stepped rim with a horizontal shoulder encircled by a vertical bead;
    at least one second utensil having a double-edged rim provided with an outer edge with a generally vertical flange encircled by a horizontal flange that is adapted to rest on said horizontal shoulder in both the upright and inverted positions; and
    at least one third utensil having a rim contoured to rest on either said horizontal flange or said horizontal shoulder,
    whereby a said third utensil can serve as a cover for a said first utensil and so can a said second utensil, and a second second utensil can also serve as a cover for a said third utensil, and the three can be put together with the said second utensil sandwiched between a said first utensil and a said third utensil.

2. The kit of claim 1 having a plurality of said second utensils with identical rims stackable on each other with the rim of the bottom one seated on the rim of a said first utensil and with the rim of a said second utensil stackable on the rim of the topmost said second utensil.

3. The kit of claim 1 having a plurality of said first utensils nestable in each other.

4. The kit of claim 1 including a plurality of said first utensils nestable in each other, at least one of said first utensils being nestable in a said third utensil.

5. The kit of claim 1 wherein one of said first and third utensils is provided with strap-aligning means, and a strap holding the kit together.

6. A cooking kit for campers and the like enabling use of various utensils in combinations with other utensils and compact packing of the whole, including in combination:
    a kettle-like vessel having a rim that is stepped outwardly to provide a horizontal shoulder encircled by a vertical bead;
    at least one plate-cover member having a double-edged rim with a generally vertical flange encircled by a horizontal flange that is adapted to rest on said shoulder in both the upright and inverted positions of said member; and
    a frying pan having an edge adapted to rest on either said horizontal flange or said horizontal shoulder,
    whereby said frying pan can serve as a cover for said kettle and so can said plate-cover member, and said plate-cover member can serve as a cover for said frying pan, and the three can be put together with the plate-cover member sandwiched between the kettle and the frying pan cover member.

7. The kit of claim 6 having a plurality of plate-cover members stackable on each other with the bottom one resting on the rim of said kettle-like vessel and with the frying pan cover member stackable on the rim of the top plate-cover member.

8. The kit of claim 7 having a second kettle-like vessel with a rim identical to that on the first said kettle-like vessel, the two vessels being nestable in each other.

9. The kit of claim 8 wherein the bottommost kettle-like vessel is nestable in said frying pan.

10. The kit of claim 9 having a pair of diametrically opposite handle fittings on said frying pan and a strap passing through them for holding the kit together as a unit.

11. A cooking kit for campers and the like enabling the use of various utensils in combinations with other utensils and compact packing of the whole, including in combination:
    a first utensil having an outwardly-stepped rim, an upper sidewall portion and a lower sidewall portion of a smaller diameter than said upper sidewall portion;
    a second utensil also having an outwardly stepped rim, an upper sidewall portion and a lower sidewall portion of a smaller diameter than its upper portion connected by an annular shoulder, said latter lower sidewall portion having a diameter less than said upper portion but greater than said lower portion of said first utensil; and a third utensil forming a cover having an edge member compatible with the rims of both the first and second utensil; and a fourth utensil having a diameter greater than the lower portion and substantially equal to the diameter of the upper portion of said second utensil;

whereby said first utensil is nestable within said second utensil when the cooking kit is packed and said second utensil fits within said first utensil with its shoulder on the rim of the first utensil when said kit is used as a double boiler.

12. A cooking kit for campers and the like enabling the use of various utensils in combinations with other utensils and compact packing of the whole, including in combination:

a first utensil having an outwardly-stepped rim, an upper sidewall portion and a lower sidewall portion of a smaller diameter than said upper sidewall portion;

a second utensil also having an outwardly stepped rim, an upper sidewall portion and a lower sidewall portion of a smaller diameter than its upper portion connected by an annular shoulder, said latter lower sidewall portion having a diameter less than said upper portion but greater than said lower portion of said first utensil; and a third utensil forming a cover having an edge member compatible with the rims of both the first and second utensil; and a plurality of plate-cover members stackable on each other with the bottom one resting on the rim of said first utensil;

whereby said first utensil is nestable within said second utensil when the cooking kit is packed and said second utensil fits within said first utensil with its shoulder on the rim of the first utensil when said kit is used as a double boiler.

References Cited

FOREIGN PATENTS 323,866 10/1957 Switzerland.
372,024 5/1932 Great Britain.
637,078 2/1962 Canada.

WILLIAM T. DIXSON, Jr., Primary Examiner

U.S. Cl. X.R.

220—8, 97